United States Patent [19]
Oshiro et al.

[11] Patent Number: 5,937,419
[45] Date of Patent: Aug. 10, 1999

[54] PAGE TURNING APPARATUS FOR USE WITH COMPUTER SYSTEM

[75] Inventors: Masami Oshiro, Nagareyama; Shinichi Teramura, Tama; Jiro Tabata, Sapporo, all of Japan

[73] Assignee: Kabushiki Kaisha Toshiba, Japan

[21] Appl. No.: 08/715,888

[22] Filed: Sep. 18, 1996

[30] Foreign Application Priority Data

Sep. 19, 1995 [JP] Japan .................................. 7-240119

[51] Int. Cl.⁶ ................................................ G06F 17/21
[52] U.S. Cl. ........................................ 707/514; 345/350
[58] Field of Search ............................. 345/350; 707/514

[56] References Cited

U.S. PATENT DOCUMENTS

| | | | |
|---|---|---|---|
| 5,237,651 | 8/1993 | Randall ................................... | 345/350 |
| 5,283,864 | 2/1994 | Knowlton ................................ | 345/350 |
| 5,392,387 | 2/1995 | Fitzpatrick et al. ..................... | 345/350 |
| 5,438,662 | 8/1995 | Randall ................................... | 345/350 |
| 5,463,725 | 10/1995 | Henckel et al. ......................... | 345/350 |

FOREIGN PATENT DOCUMENTS 0 317 480   5/1989   European Pat. Off. .

OTHER PUBLICATIONS

"Visual Two–level Information Categorization," IBM Technical Disclosure Bulletin, vol. 35, No. 2, Jul. 1, 1992, pp. 189–190, XP000313266.

Metz S: "Menu–Based Control For Consumer Products Menu–Based Human–Computer Interfaces Can Expand The Power And Accessibility Of Small Consumer Products, Especially For Novice Users," Scientific Honeyweller, Jan. 1, 1993, pp. 113–116, XP000425441.

European Search Report for Application No. EP 96 11 4915 dated Oct. 9, 1997.

*Primary Examiner*—Joseph H. Feild
*Assistant Examiner*—John L. Young
*Attorney, Agent, or Firm*—Finnegan, Henderson, Farabow, Garrett & Dunner, L.L.P.

[57] ABSTRACT

Symbols of a plurality of page turning buttons and one guide display button are displayed on a screen of a computer system. A page turning apparatus for use with a computer system has a screen data table that stores information of page turning buttons for individual pages to be turned and information of pages displayed by the page turning buttons. When one of the page turning buttons is selected by an input unit such as a mouse, the page turning apparatus obtains page information corresponding to the selected page turning button from the screen data table and replaces the current screen page of the computer system with a page corresponding to the obtained page information. In addition, the page turning apparatus has a screen page hierarchical data table corresponding to functions of pages that can be displayed. When a guide display button is selected by the input unit such as the mouse, the page turning apparatus generates a screen page hierarchical chart that hierarchically represents the relation of individual pages based on the screen hierarchical data table, changes the color of a part of the screen page hierarchical chart so as to distinguish the current screen page in the screen page hierarchical chart, and displays the screen page hierarchical chart as a window on the screen of the computer system.

12 Claims, 26 Drawing Sheets

FIG. 2

| OPERATION TYPE | OPERATION POINT | |
|---|---|---|
| KEYBOARD X INPUT | (5,10) | ~d1a |
| CLICKING MOUSE LEFT BUTTON | (15,8) | ~d1b |
| CLICKING MOUSE RIGHT BUTTON | (30,20) | |
| ⋮ | ⋮ | |

FIG. 3

| SCREEN PAGE NUMBER | BUTTON TYPE NUMBER | | | | |
|---|---|---|---|---|---|
| | 0 | 1 | 2 | 3 | ... |
| 1 | (10~20,5~10) | | | (30~40,5~10) | |
| 2 | (10~20,5~10) | (30~40,5~10) | | | |
| ⋮ | ⋮ | ⋮ | ⋮ | ⋮ | ⋮ |

| BUTTON TYPE NUMBER | NAME | PAGE TURNING OPERATION | DESTINATION PAGE NUMBER |
|---|---|---|---|
| 0 | "GUIDE" | CLICKING MOUSE LEFT BUTTON | 0 |
| 1 | "LOWER HIERARCHICAL" | CLICKING MOUSE LEFT BUTTON | 5 |
| ⋮ | ⋮ | ⋮ | ⋮ |

| SCREEN PAGE NUMBER | HIERARCHY NUMBER | FUNCTION NUMBER |
|---|---|---|
| ⋮ | ⋮ | ⋮ |
| $N_i$ | N | i |
| $(N+1)_j$ | N+1 | j |
| $(N+1)_{j+1}$ | N+1 | j+1 |
| $(N+2)_k$ | N+2 | k |
| $(N+3)_l$ | N+3 | l |
| ⋮ | ⋮ | ⋮ |

| SCREEN PAGE NUMBER | BUTTON TYPE NUMBER | | | | |
|---|---|---|---|---|---|
| | 0 | 1 | 2 | 3 | ... |
| 1 | (10~20,5~10) | | | (30~40,5~10) | |
| X | (10~20,5~10) | (30~40,5~10) | (50~60,5~10) | | |
| ⋮ | ⋮ | ⋮ | ⋮ | ⋮ | ⋮ |

| BUTTON TYPE NUMBER | NAME | PAGE TURNING OPERATION | DESTINATION PAGE NUMBER |
|---|---|---|---|
| 1 | 「$(N+2)_k$」 | CLICKING MOUSE LEFT BUTTON | $(N+2)_k$ |
| 2 | 「$(N+1)_k$」 | CLICKING MOUSE LEFT BUTTON | $(N+1)_k$ |
| 3 | 「$(N+1)_{k+1}$」 | CLICKING MOUSE LEFT BUTTON | $(N+1)_{k+1}$ |
| ⋮ | ⋮ | ⋮ | ⋮ |

| SCREEN PAGE NUMBER | HIERARCHY NUMBER | FUNCTION NUMBER | SCREEN COLOR NUMBER |
|---|---|---|---|
| ⋮ | ⋮ | ⋮ | ⋮ |
| $N_i$ | N | i | W |
| $(N+1)_j$ | N+1 | j | X |
| $(N+1)_{j+1}$ | N+1 | j+1 | X |
| $(N+2)_k$ | N+2 | k | Y |
| $(N+3)_l$ | N+3 | l | A |
| ⋮ | ⋮ | ⋮ | ⋮ |

FIG. 15

| SCREEN PAGE NUMBER | BUTTON TYPE NUMBER | | | | |
|---|---|---|---|---|---|
| | 0 | 1 | 2 | 3 | ... |
| 1 | (10~20,5~10) | | | (30~40,5~10) | |
| 2 | (10~20,5~10) | (30~40,5~10) | | | |
| ⋮ | ⋮ | ⋮ | ⋮ | ⋮ | ⋮ |

| BUTTON TYPE NUMBER | NAME | PAGE TURNING OPERATION | DESTINATION PAGE NUMBER |
|---|---|---|---|
| 0 | "CANCEL" | CLICKING MOUSE LEFT BUTTON | 0 |
| 1 | "LOWER HIERARCHICAL" | CLICKING MOUSE LEFT BUTTON | 5 |
| ⋮ | ⋮ | ⋮ | ⋮ |

FIG. 18

| SCREEN PAGE NUMBER | BUTTON TYPE NUMBER | | | | |
|---|---|---|---|---|---|
| | 0 | 1 | 2 | 3 | ... |
| 1 | (10~20,5~10) | | | (30~40,5~10) | |
| $N_i$ | (10~20,5~10) | (30~40,5~10) | (50~60,5~10) | | |
| ⋮ | ⋮ | ⋮ | ⋮ | ⋮ | ⋮ |

| BUTTON TYPE NUMBER | NAME | PAGE TURNING OPERATION | DESTINATION PAGE NUMBER |
|---|---|---|---|
| 1 | "FUNCTION 1" | CLICKING MOUSE LEFT BUTTON | $(N+2)_k$ |
| 2 | "FUNCTION 2" | CLICKING MOUSE LEFT BUTTON | $(N+1)_k$ |
| 3 | "FUNCTION 3" | CLICKING MOUSE LEFT BUTTON | $(N+1)_{k+1}$ |
| ⋮ | ⋮ | ⋮ | ⋮ |

FIG. 22

| SCREEN PAGE NUMBER | BUTTON TYPE NUMBER | | | | |
|---|---|---|---|---|---|
| | 0 | 1 | 2 | 3 | ... |
| 1 | (10~20,5~10) | | | (30~40,5~10) | |
| $M_k$ | (10~20,5~10) | (30~40,5~10) | (50~60,5~10) | | |
| ⋮ | ⋮ | ⋮ | ⋮ | ⋮ | ⋮ |

| BUTTON TYPE NUMBER | NAME | PAGE TURNING OPERATION | DESTINATION PAGE NUMBER |
|---|---|---|---|
| 1 | "FUNCTION 1" | CLICKING MOUSE LEFT BUTTON | $(M+2)_k$ |
| 2 | "FUNCTION 2" | CLICKING MOUSE LEFT BUTTON | $(M+1)_k$ |
| 3 | "FUNCTION 3" | CLICKING MOUSE LEFT BUTTON | $(M+1)_{k+1}$ |
| ⋮ | ⋮ | ⋮ | ⋮ |

FIG. 24

| SCREEN PAGE NUMBER | HIERARCHY NUMBER | FUNCTION NUMBER |
|---|---|---|
| ⋮ | ⋮ | ⋮ |
| $M_k$ | $M$ | $k$ |
| $(M+1)_k$ | $M+1$ | $k$ |
| $(M+1)_{k+1}$ | $M+1$ | $k+1$ |
| $(M+2)_k$ | $M+2$ | $k$ |
| $(M+3)_k$ | $M+3$ | $k$ |
| ⋮ | ⋮ | ⋮ |

| FUNCTION NUMBER (51a) | SCREEN COLOR NUMBER | SCREEN COLOR NUMBER \ HIERARCHY NUMBER (51) | ... | M | M+1 | M+2 | ... |
|---|---|---|---|---|---|---|---|
| | | ⋮ | | | | | |
| | | W | | 5 | 19 | 64 | |
| k | W | X | | 7 | 20 | 43 | |
| k+1 | X | Y | | 9 | | | |
| k+2 | Y | Z | | 21 | | | |
| k+3 | Z | A | | | | | |
| k | A | | | | | | |
| ⋮ | ⋮ | ⋮ | | | | | |

(51b)

PAGE TURNING APPARATUS FOR USE WITH COMPUTER SYSTEM

BACKGROUND OF THE INVENTION

1. Field of the Invention

The present invention relates to a page turning apparatus for use with a computer system.

2. Description of the Related Art

In a recent computer system for use with a plant operation supervising unit, a plant operation simulator, or the like, as interactive functions or man-machine interface functions increase, the number of pages displayed on a CRT screen or the like tends to increase. These screen pages are hierarchized corresponding to individual functions. To display a desired page on the screen, hierarchical pages are turned level by level.

So far, a page turning operation has been performed in accordance with a guidance shown on the screen. For example, several page turning buttons for displaying higher hierarchical pages or lower hierarchical pages are provided. By clicking or touching a desired "page turning button" with a pointing device such as a mouse or a touch sensor panel, the current page is turned or changed to a desired page.

In the conventional method for turning or changing the current page to a desired page with such a "page turning button", pages that can be displayed next are controlled by the computer system. Thus, from the user's point of view, without knowledge of man-machine interface functions of individual screen pages, the user cannot know a screen page that is displayed next. Consequently, the user does not know whether he or she can immediately evoke a desired function.

As described above, since the conventional page turning apparatus of the computer system does not have a means for allowing the user to know the position of the current screen page in the hierarchy, unless he or she is familiar with the man-machine interface functions of the individual screen pages, he or she cannot know how to turn the current screen page to a screen page corresponding to a desired function.

In addition, when the conventional page turning apparatus of the computer system has a plurality of page turning means such as page turning buttons, the user cannot easily know the hierarchical and functional relation between screen pages displayed by the individual page turning buttons. Thus, the user cannot know what page will be displayed by each of the page turning buttons.

Moreover, since the conventional page turning apparatus of the computer system does not have a means for restoring the preceding page, after the current screen page is turned to another page, it is difficult to turn the preceding page back on the screen directly.

In addition, in the conventional page turning apparatus of the computer system, since the page turning means such as page turning buttons are not related to the screen hierarchy, unless the user is familiar with the man-machine interface functions of individual pages, he or she cannot accurately know functions which can be provided by the page turning.

SUMMARY OF THE INVENTION

Therefore, an object of the present invention is to provide a page turning apparatus for use with a computer system that can solve the above-described problems and easily turn the current page to a page corresponding to a desired man-machine interface function.

Another object of the present invention is to provide a page turning apparatus for use with a computer system that allows the user to easily know the hierarchical and functional relation between screen pages that can be turned from the current screen page.

A further object of the present invention is to provide a page turning apparatus for use with a computer system that can easily restore the current screen page to the previous screen page.

The present invention is a page turning apparatus for use with a computer system, the apparatus comprising a display unit, an input unit, means for a page turning symbol on a page displayed on a screen of the display unit, means for turning a current page on the screen to a page related to the page turning symbol which is selected by the input unit, and means for representing a hierarchical relation between a current screen page displayed on the display unit and a page that can be turned from the current screen page.

These and other objects, features and advantages of the present invention will become more apparent in light of the following detailed description of best mode embodiments thereof, as illustrated in the accompanying drawings. In the drawings, for simplicity, similar portions are denoted by similar reference numerals.

BRIEF DESCRIPTION OF THE DRAWINGS

FIG. 2 is a schematic diagram showing an example of data that is output from an input processing portion;

FIG. 3 is a schematic diagram showing an example of data stored in a screen data table shown in FIG. 1;

FIG. 5 is a schematic diagram showing an example of data stored in a screen page hierarchical data table shown in FIG. 1;

FIG. 10 is a schematic diagram showing an example of data stored in a screen data table shown in FIG. 9;

FIG. 12 is a schematic diagram showing an example of data stored in a screen page hierarchical data table shown in FIG. 9;

FIG. 15 is a schematic diagram showing an example of data stored in a screen data table shown in FIG. 14;

FIG. 18 is a schematic diagram showing an example of data stored in a screen data table shown in FIG. 17;

FIG. 22 is a schematic diagram showing an example of data stored in a screen data table shown in FIG. 21;

FIG. 24 is a schematic diagram showing an example of data stored in a screen page hierarchical data table shown in FIG. 21;

FIG. 25 is a schematic diagram showing an example of data stored in a screen color data table shown in FIG. 21.

DESCRIPTION OF THE PREFERRED EMBODIMENTS

Figure 1:
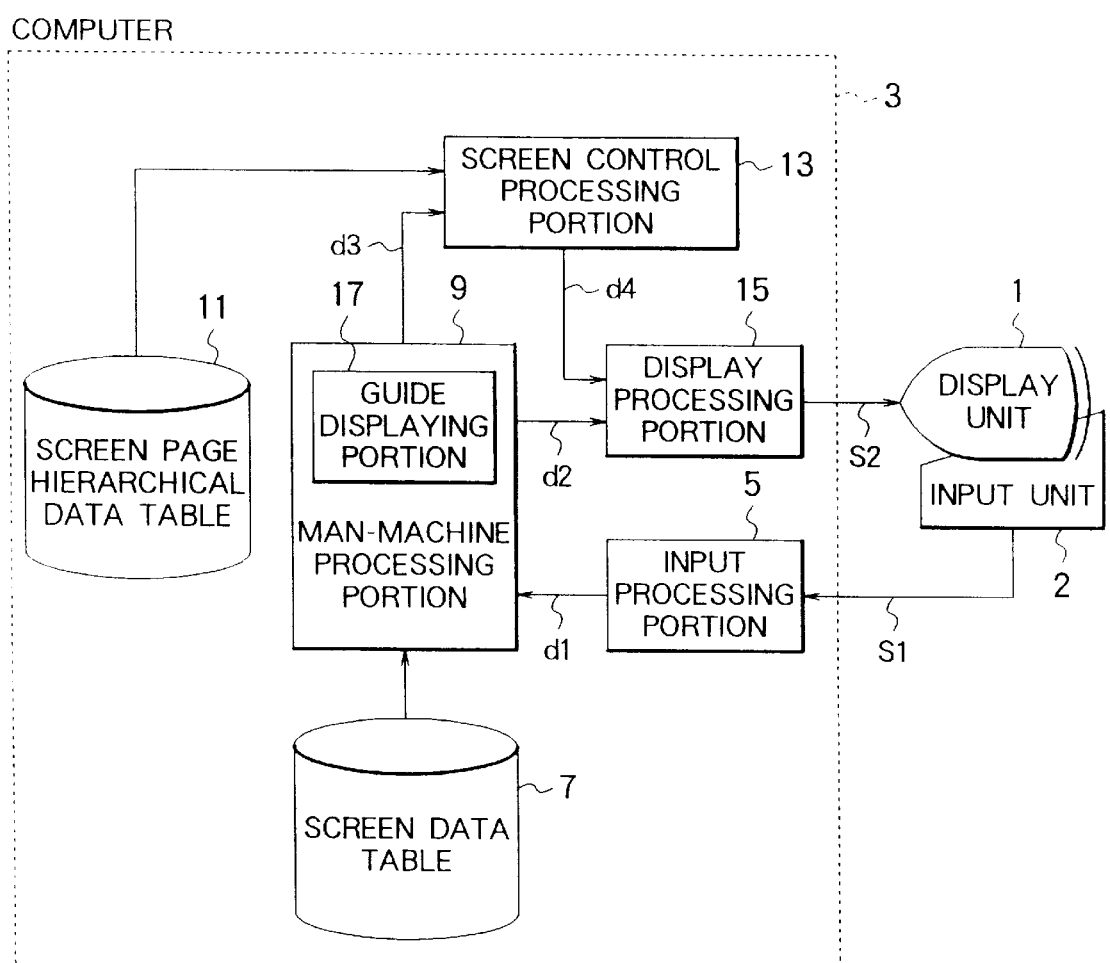
FIG. 1 is a block diagram showing a page turning apparatus according to a first embodiment of the present invention.

Now, with reference to FIG. 1, a page turning apparatus according to a first embodiment of the present invention will be described. The page turning apparatus for use with a computer system is composed of a display unit 1 such as a CRT or a liquid crystal display unit, an input unit 2 such as a keyboard, a mouse, and/or a touch sensor panel, and a computer 3. The computer 3 is composed of an input processing portion 5, a screen data table 7, a man-machine processing portion 9, a screen page hierarchical data table 11, a screen control processing portion 13, and a display processing portion 15. The input processing portion 5 converts a signal s1 received from the input unit 2 into data d1. The screen data table 7 stores information of individual screen pages displayed on the display unit 1. The man-machine processing portion 9 inputs the data d1 and generates screen data d2 displayed on the display unit 1 based on the screen page data table 7. The screen page hierarchical data table 11 stores screen page hierarchical information that represents the hierarchical and functional relation between each screen page. The screen control processing portion 13 generates guide display data d4 based on the screen page hierarchical data table 11 corresponding to the guide display request d3 that is output from the man-machine processing portion 9. The display processing portion 15 inputs the screen data d2 from the man-machine processing portion 9 and guide display data d4 from the screen control processing portion 13 and outputs a display signal s2 to the display unit 1.

As shown in FIG. 2, data d1 received by the man-machine processing portion 9 from the input processing portion 5 is composed of an operation type and coordinate data of an operation point. For example, when an alphanumeric character X is input on the CRT screen from the keyboard as the input unit 2, data d1a is output from the input processing portion 5 to the man-machine processing portion 9. When the left button of the mouse as the input unit 2 is clicked on the CRT screen, data d1b is output from the input processing portion 5.

FIG. 3 shows an example of data stored in the screen data table 7. The screen data table 7 stores data tables 7a and 7b. The data table 7a has a screen page number field and a button type field. The button type field stores display regions corresponding to button types of individual screen page numbers. The data table 7b has a button type field, a name field 7b1, an operation type field 7b2, and a destination page number field 7b3. In addition, the screen data table 7 stores data (not shown) intrinsic to screen pages corresponding to screen page numbers.

Figure 4:
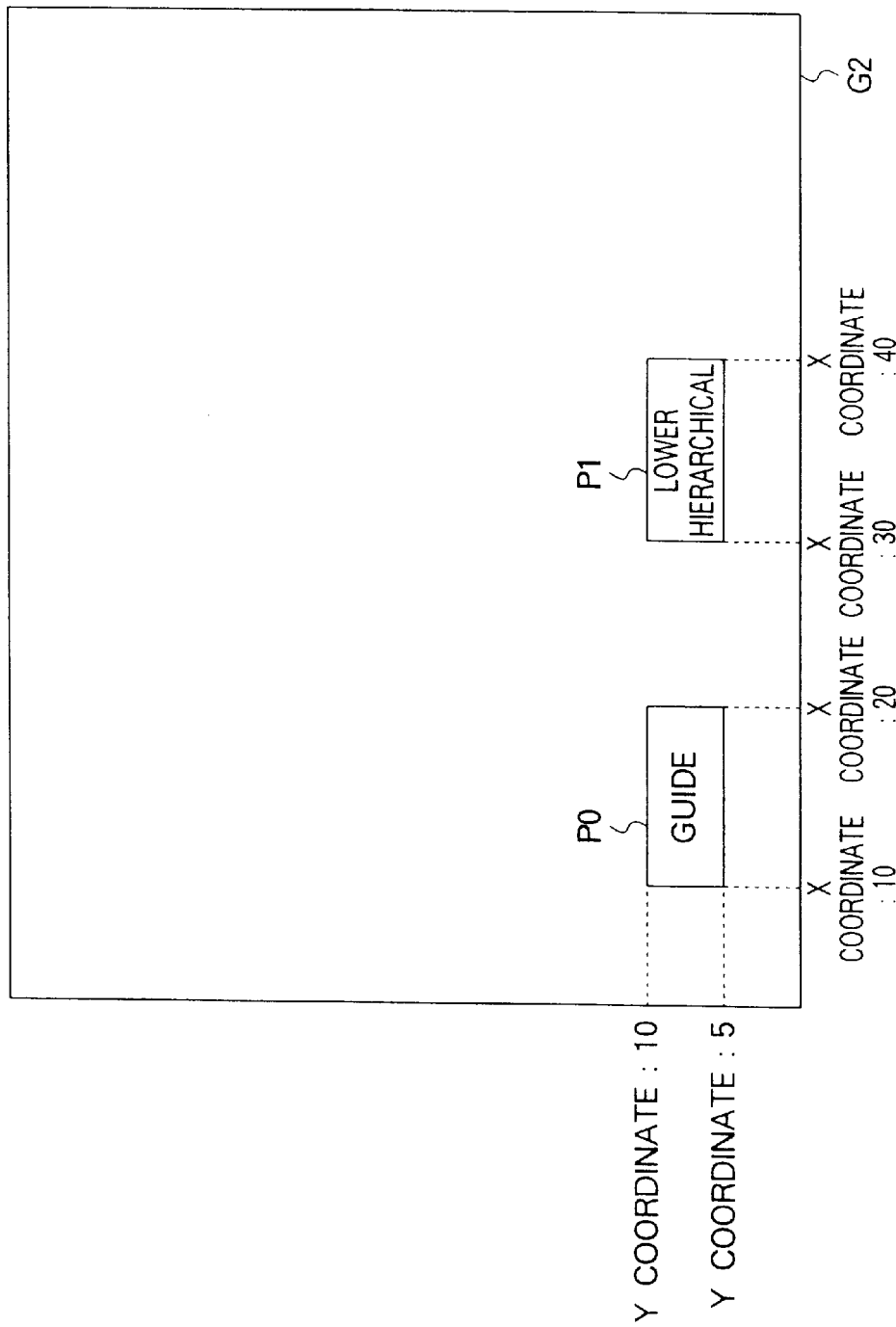
FIG. 4 is a schematic diagram showing a screen image corresponding to screen page number 2 in the screen data table shown in FIG. 3.

For example, the screen page corresponding to screen page number 2 has two buttons corresponding to button type numbers 0 and 1. The display regions of the buttons corresponding to the button numbers 0 and 1 are (10 to 20, 5 to 10) and (30 to 40, 5 to 10) that are X coordinates and Y coordinates on the CRT. The name of the button corresponding to button type number 0 is "guide". The name of the button corresponding to button type number 1 is "lower hierarchical". Thus, the screen image G2 corresponding to screen page number 2 is displayed as shown in FIG. 4. When the "guide" button P0 is selected by clicking the left button of the mouse, since the destination page number is 0, the man-machine processing portion 9 determines that a guide display request has been issued. Thus, the guide displaying portion 17 outputs the guide display request d3 to the screen control processing portion 13. When the "lower hierarchical" button P1 is selected by clicking the left button of the mouse, the man-machine processing portion 9 generates screen data corresponding to screen page number 5. Thus, the display processing portion 15 causes the display unit 1 to substitute the current screen page with the page corresponding to screen page number 5.

FIG. 5 shows an example of data in the screen page hierarchical data table 11. The screen page hierarchical data table 11 has a screen page number field, a hierarchy number field, and a function number field. The hierarchy number field stores hierarchical positions corresponding to screen page numbers. The functional number field stores horizontal positions dependent on functions in individual hierarchical levels. The screen control processing portion 13 generates guide display data as a screen page hierarchical chart that hierarchically represents the relation between the current screen page and other pages based on the screen page hierarchical data table 11 corresponding to the guide display request d3 received from the guide displaying portion 17.

Figure 7:
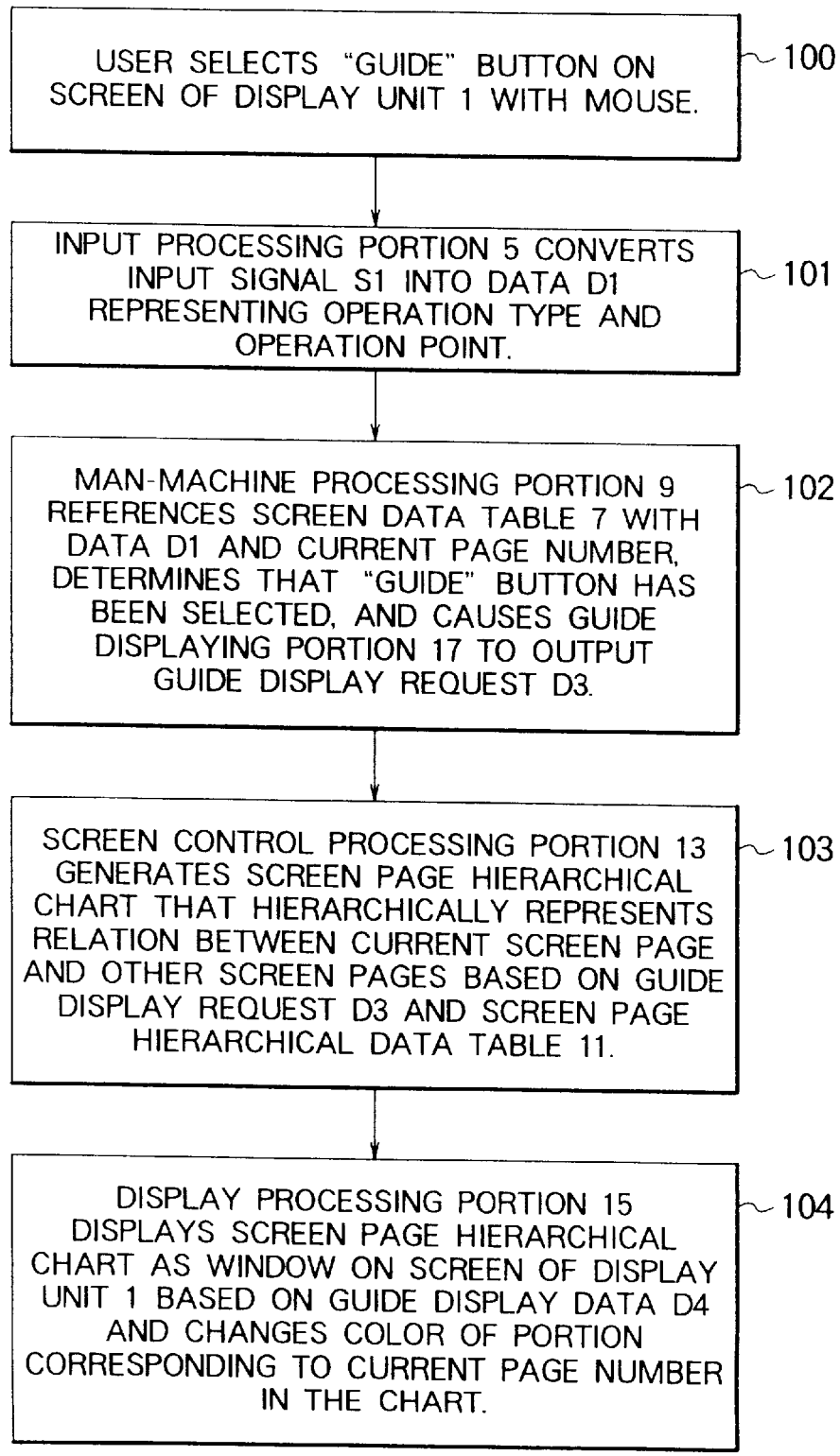
FIG. 7 is a flow chart showing an example of the operation of the first embodiment.

FIG. 7 is a flow chart showing the operation of the page turning apparatus according to the embodiment in the case that the user operates the "guide" button P0 on the screen image G2 corresponding to screen page number 2 of the display unit 1 as shown in FIG. 4.

At step 100, when the user clicks the left but on of the mouse at the position of the "guide" button P0 on the screen G2 corresponding to screen page number 2 shown in FIG. 4, the flow advances to step 101. At step 101, the input processing portion 5 provides the data d1 composed of the operation type (clicking the mouse left button) and operation point, to the man-machine processing portion 9.

At step 102, the man-machine processing portion 9, which has stored screen page number 2 that is currently displayed on the display unit 1, determines that the button corresponding to button type number 0 has been selected based on screen page number 2 and the data d1 received from the input process portion 5, and obtains destination page number 0 from the screen data table 7 shown in FIG. 3.

When the destination page number is 0, in the guide displaying portion 17 the man-machine processing portion 9 outputs as the guide display request d3 the number of the screen page that is currently displayed to the screen control processing portion 13.

Figure 6:
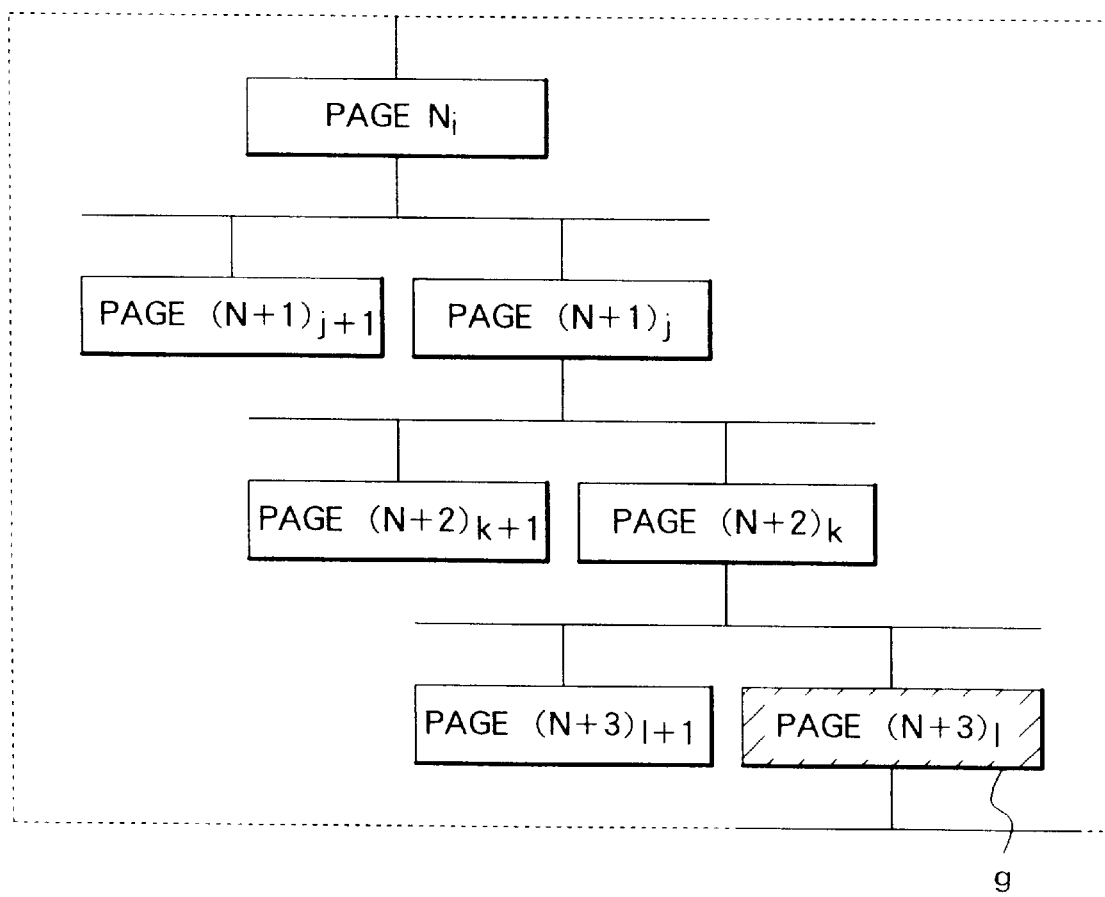
FIG. 6 is a schematic diagram showing an example of a screen page hierarchical chart guide displayed on a screen of a display unit.

At step 103, the screen control processing portion 13 references the screen page hierarchical data table 11 shown in FIG. 5 about the number of the current page received as the guide display request d3, generates a screen page hierarchical chart as shown in FIG. 6, changes the color of the portion corresponding to the current screen page into another color different from the colors of the other pages, and outputs the guide display data d4 to the display processing portion 15.

At step 104, the display processing portion 15 displays the screen page hierarchical chart guide as shown in FIG. 6 as a window on the screen G2 of the display unit 1.

FIG. 6 shows an example of the screen page hierarchical chart guide displayed in the case that the current screen page number received as the guide display request d3 is $(N+3)1$. The portion g corresponding to the screen page that is currently displayed is displayed in a different color. Thus, the page displayed as the screen image G2 can be immediately distinguished in the screen hierarchical chart.

In this embodiment, by selecting the "guide" button on the screen by a predetermined operating method, the screen page hierarchical chart guide as shown in FIG. 6 can be displayed. With the screen page hierarchical chart guide, the relation between the current screen page and a destination screen page can be easily known.

Figure 8:
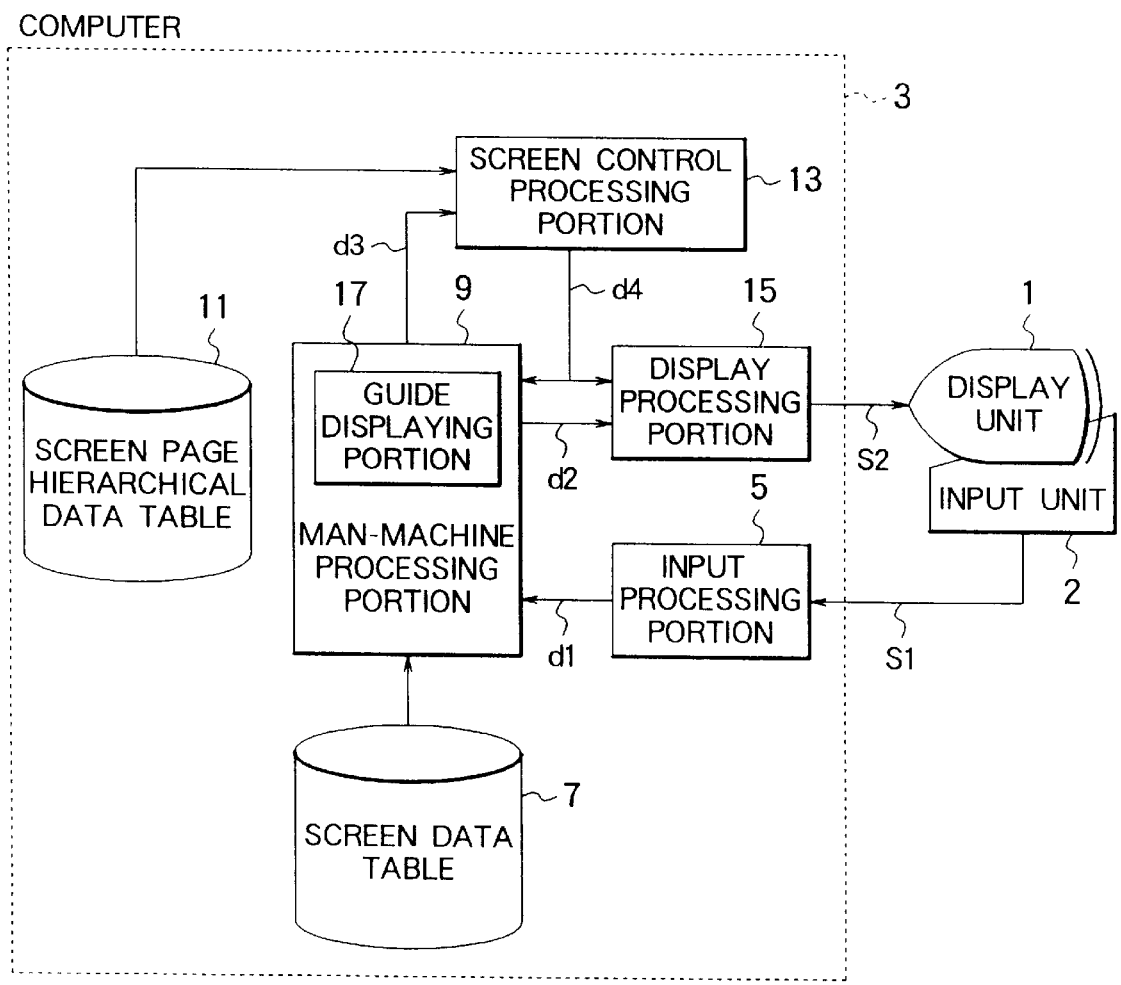
FIG. 8 is a block diagram showing a page turning apparatus according to a second embodiment of the present invention.

Now, with reference to FIG. 8, a page turning apparatus according to a second embodiment of the present invention will be described. In the second embodiment, to allow a destination page to be selected with the screen page hierarchical chart guide displayed as a window on a display unit 1, guide display data d4 generated by a screen control processing portion 13 is sent to a man-machine processing portion 9. The man-machine processing portion 9 temporarily stores a display region of the window for the screen page hierarchical chart guide, display regions of individual screen pages in the screen page hierarchical chart guide, and the selected operation type.

In the state that the screen page hierarchical chart guide shown in FIG. 6 is displayed as a window on the display unit 1, when a page $(N+2)_{k+1}$ in the screen page hierarchical chart guide is selected by the mouse, an operation signal s1 is sent to an input processing portion 5. The input processing portion 5 converts the operation signal s1 into data d1. The data d1 is input to the man-machine processing portion 9.

The man-machine processing portion 9 determines whether or not an operation point of the data d1 is in the display region of the window. When the operation point is not in the display region of the window, the man-machine processing portion 9 references a screen data table 7 as shown in FIG. 3 and performs the above-mentioned normal process. When the operation point is in the display region of the window, the man-machine processing portion 9 determines that the operation point of the data d1 is in a display region of a page $(N+2)_{k+1}$ in the screen page hierarchical chart guide and obtains a screen page number corresponding to the page $(N+2)_{k+1}$. The man-machine processing portion 9 references the screen data table 7, generates screen data corresponding to the screen page number, and outputs the screen data to a display processing portion 15.

The display processing portion 15 replaces the screen data displayed on the display unit 1 with screen data received from the man-machine processing portion 9.

Thus, in the second embodiment, with the screen page hierarchical chart guide displayed as a window on the display unit 1, a destination page can be easily and freely selected.

Figure 9:
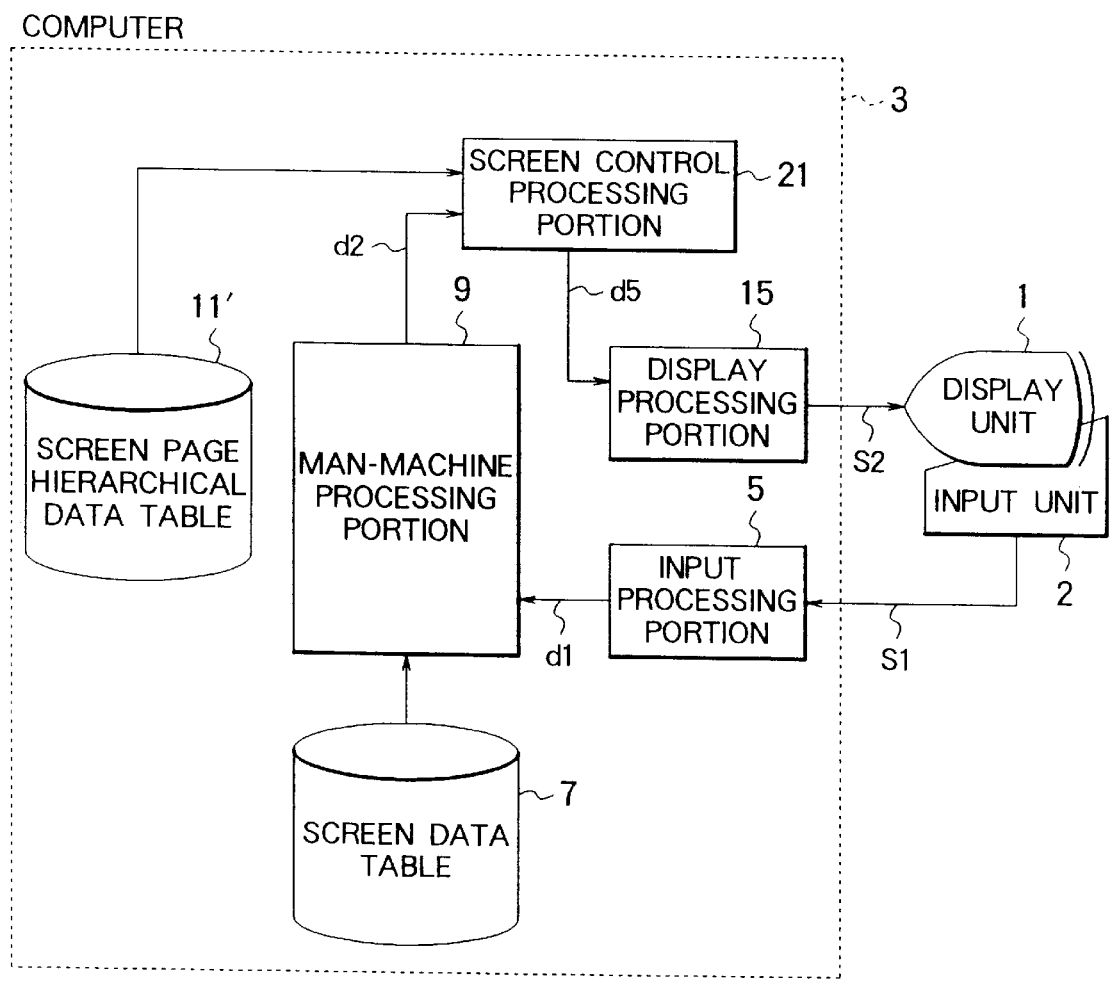
FIG. 9 is a block diagram showing a page turning apparatus according to a third embodiment of the present invention.

Now, with reference to FIG. 9, a page turning apparatus according to a third embodiment of the present invention will be described. A computer 3 of the page turning apparatus is composed of an input processing portion 5, a screen data table 7, a man-machine processing portion 9, a screen page hierarchical data table 11', a screen control processing portion 21, and a display processing portion 15. The input processing portion 5 converts a signal s1 received from an input unit 2 into data d1. The screen data table 7 stores various information such as page turning buttons for screen pages displayed on a display unit 1. The man-machine processing portion 9 references the screen data table 7 and generates screen data d2 corresponding to the data d1. The screen pages hierarchical data table 11' stores information of the relation of positions in the screen page hierarchy and screen colors of page turning buttons corresponding to hierarchical levels. The screen control processing portion 21 references the screen page hierarchical data table 11' corresponding to the screen data d2 received from the man-machine processing portion 9 and outputs screen data d5 representing screen colors of page turning buttons to be displayed on the screen. The display processing portion 15 inputs screen data d5 from the screen control processing portion 21 and outputs a display signal s2 to the display unit 1.

FIG. 10 shows an example of page turning button information for individual screen pages stored in the screen data table 7. In this embodiment, page turning buttons displayed on the screen have names of pages to be displayed by these buttons. Thus, the screen data table 7 has destination page names corresponding to button type numbers.

Figure 11:
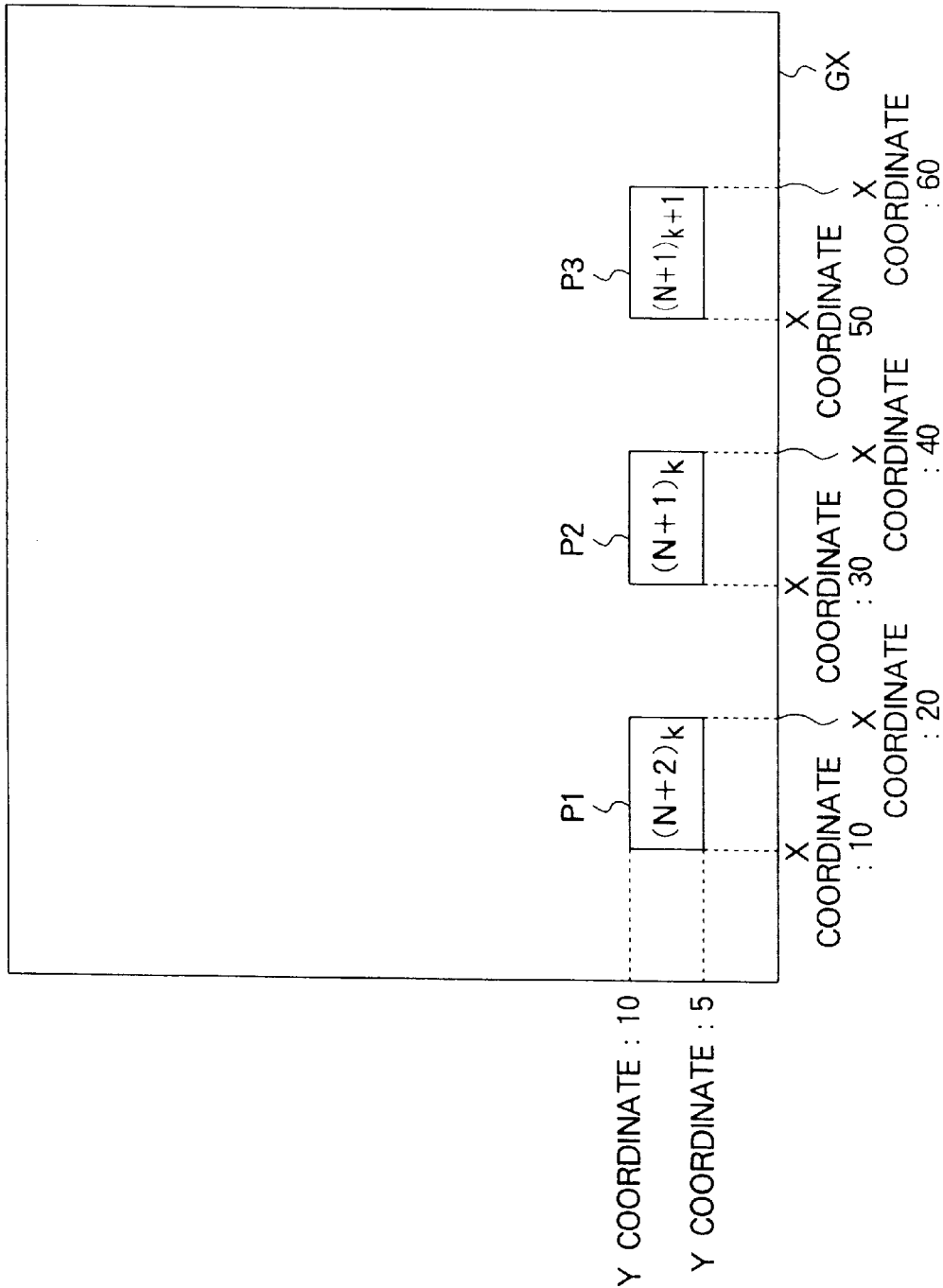
FIG. 11 is a schematic diagram showing a screen image corresponding to screen page number X in the screen data table shown in FIG. 10.

FIG. 11 shows a screen image GX corresponding to screen page number X in the screen data table 7 shown in FIG. 10. In FIG. 11, P1, P2, and P3 are page turning buttons corresponding to button type numbers 1, 2, and 3, respectively.

Figure 13:
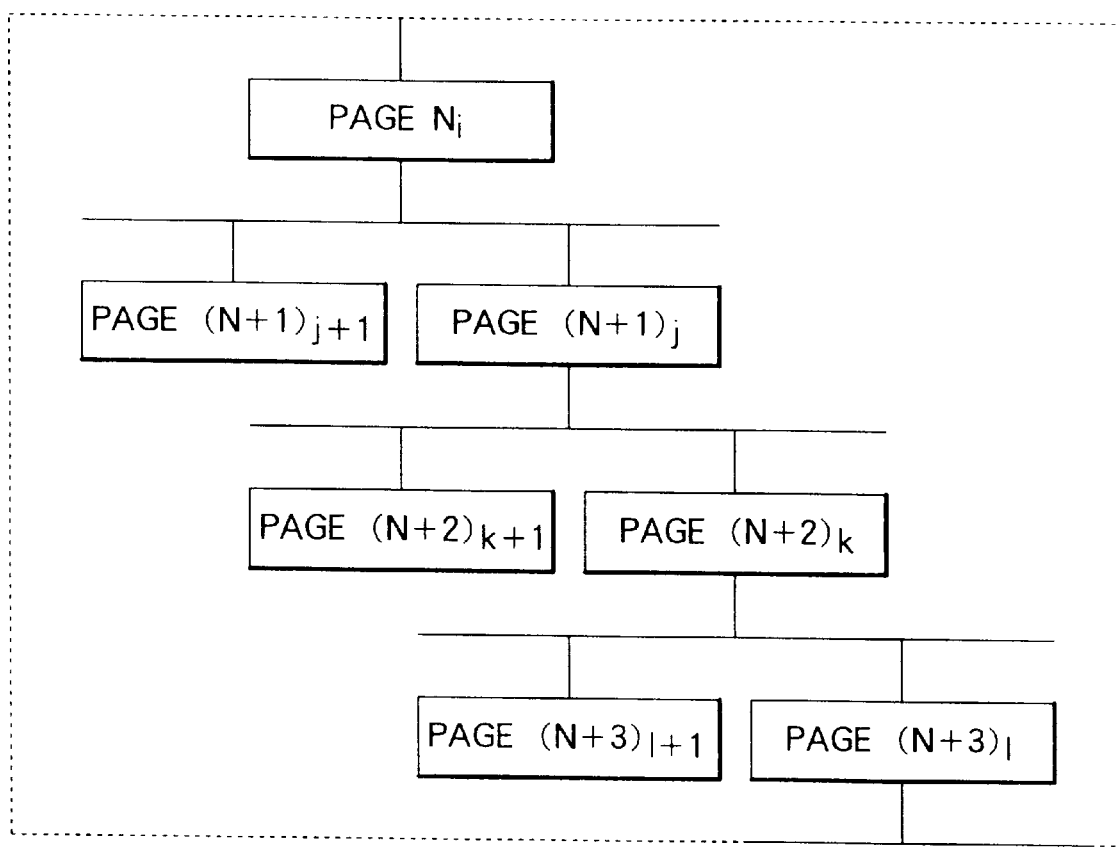
FIG. 13 is a schematic diagram showing a screen page hierarchical chart corresponding to the example of data stored in the screen page hierarchical data table shown in FIG. 12.

Unlike with the screen page hierarchical data table 11 shown in FIG. 5, the screen page hierarchical data table 11' also has a screen color number field that stores colors of page turning buttons as shown in FIG. 12. FIG. 13 is a screen page hierarchical chart corresponding to a data example in the screen page hierarchical data table 11'.

Now, with reference to FIGS. 9 to 13, the operation of the embodiment for displaying a screen image shown in FIG. 11 will be described.

When the man-machine processing portion 9 receives input data d1 from the input processing portion 5 as a result of a selecting operation of a page turning button, the man-machine processing portion 9 obtains screen data d2 composed of destination page number X, button type numbers 1, 2, and 3, and button display regions (10 to 20, 5 to 10), (30 to 40, 5 to 10), and (50 to 60, 5 to 10) from the screen data table 7 shown in FIG. 10 and outputs the screen data d2 to the screen control processing portion 21. The destination screen data d2 has default values for button colors regardless of button types.

The screen control processing portion 21 references the screen page hierarchical data table 11' shown in FIG. 12 for the screen data d2 received from the man-machine processing portion 9, sets up colors of the page turning buttons displayed on a destination screen page, and outputs button color setup screen data d5 to the display processing portion 15.

In other words, since page turning buttons corresponding to button type number 1 having destination page number $(N+2)_k$, corresponding to button type number 2 having destination page number $(N+1)_k$, and corresponding to button type number 3 having destination page number $(N+1)_{k+1}$ are displayed on a screen displaying the page of number X, screen color numbers Y, X, and X are set up to the page turning buttons according to the screen page hierarchical data table 11' shown in FIG. 12.

The display processing portion 15 displays a screen image GX as shown in FIG. 11 on the display unit 1 corresponding to the button color setup screen data d5 received from the screen control processing portion 21. The page turning button P1 corresponding to button type number 1, the page turning button P2 corresponding to button type number 2, and the page turning button P3 corresponding to button type number 3 displayed on the screen GX have destination page names "$(N+2)_k$", "$(N+1)_k$", and "$(N+1)_{k+1}$", respectively. Corresponding to the hierarchical levels of the destination pages, the color of the "$(N+1)_k$" button P2 is the same as the color of the "$(N+1)_{k+1}$" button P3. In addition, the color of the "$(N+2)_k$" button P1 is different from the colors of the "$(N+1)_k$" button P2 and the "$(N+1)_{k+1}$" button P3.

Since the colors of the page turning buttons are changed corresponding to the hierarchical levels of the destination pages, the user can recognize the function of the destination page at a glance and quickly know the page turning method from the current screen page to a desired page.

Now, with reference to FIG. 14, a page turning apparatus according to a fourth embodiment of the present invention will be described. In the page turning apparatus according to this embodiment, when a man-machine processing portion 9 generates new screen data d2 corresponding to a page turning request, the man-machine processing portion 9 outputs the screen data d2 to a display processing portion 15. In addition, the man-machine processing portion 9 sends screen data d6 of the current screen page to a screen control processing portion 31. A screen data table 7 has display information and function information of a cancellation button. The man-machine processing portion 9 displays the cancellation button on the screen of the display unit 1. When the cancellation button is operated through an input unit 2, a canceling portion 33 of the man-machine processing portion 9 outputs a cancellation request d7 to the screen control processing portion 31. When the screen control processing portion 31 receives the cancellation request d7, the screen control processing portion 31 outputs the stored screen data, which were received from the man-machine processing portion 9, as destination screen data d8 to the display processing portion 15.

FIG. 15 shows an example of button information of individual screen pages stored in the screen data table 7. In this embodiment, to accept a cancellation request, a cancellation button is displayed on the screen of the display unit 1 along with page turning buttons. As shown in FIG. 15, the screen data table 7 has a display region for the page turning cancellation button and an operation type corresponding to button type number 0. The name field corresponding to the button type number 0 has "cancel".

Figure 16:
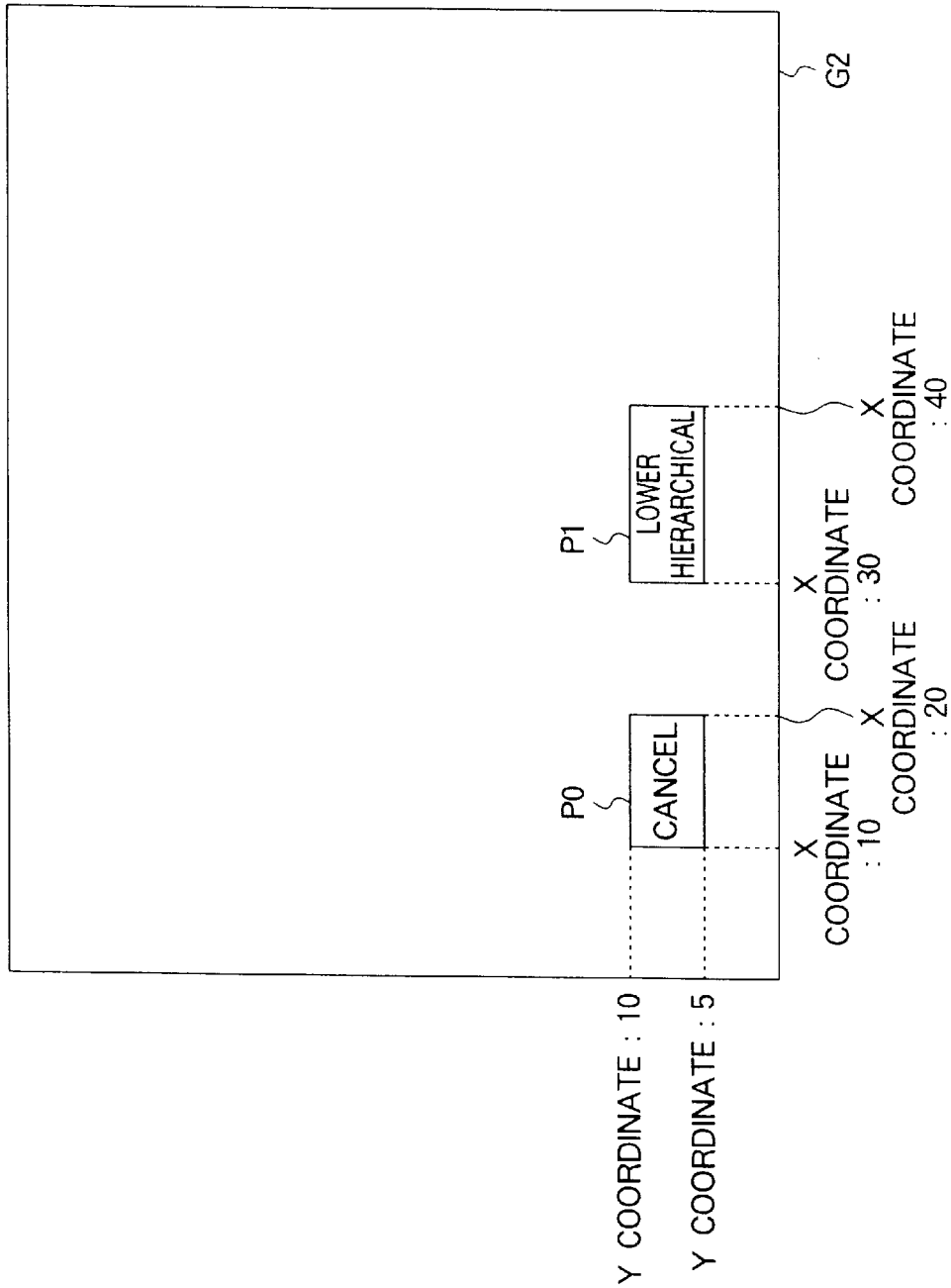
FIG. 16 is a schematic diagram showing a screen image corresponding to screen page number 2 in the screen data table shown in FIG. 15.

FIG. 16 shows a screen image G2 corresponding to screen page number 2 in the screen data table 7. The cancellation button P0 corresponding to button type number 0 denoting "cancel" and the page turning button P1 corresponding to button type number 1 denoting "lower hierarchical" are displayed on the screen G2.

Figure 14:
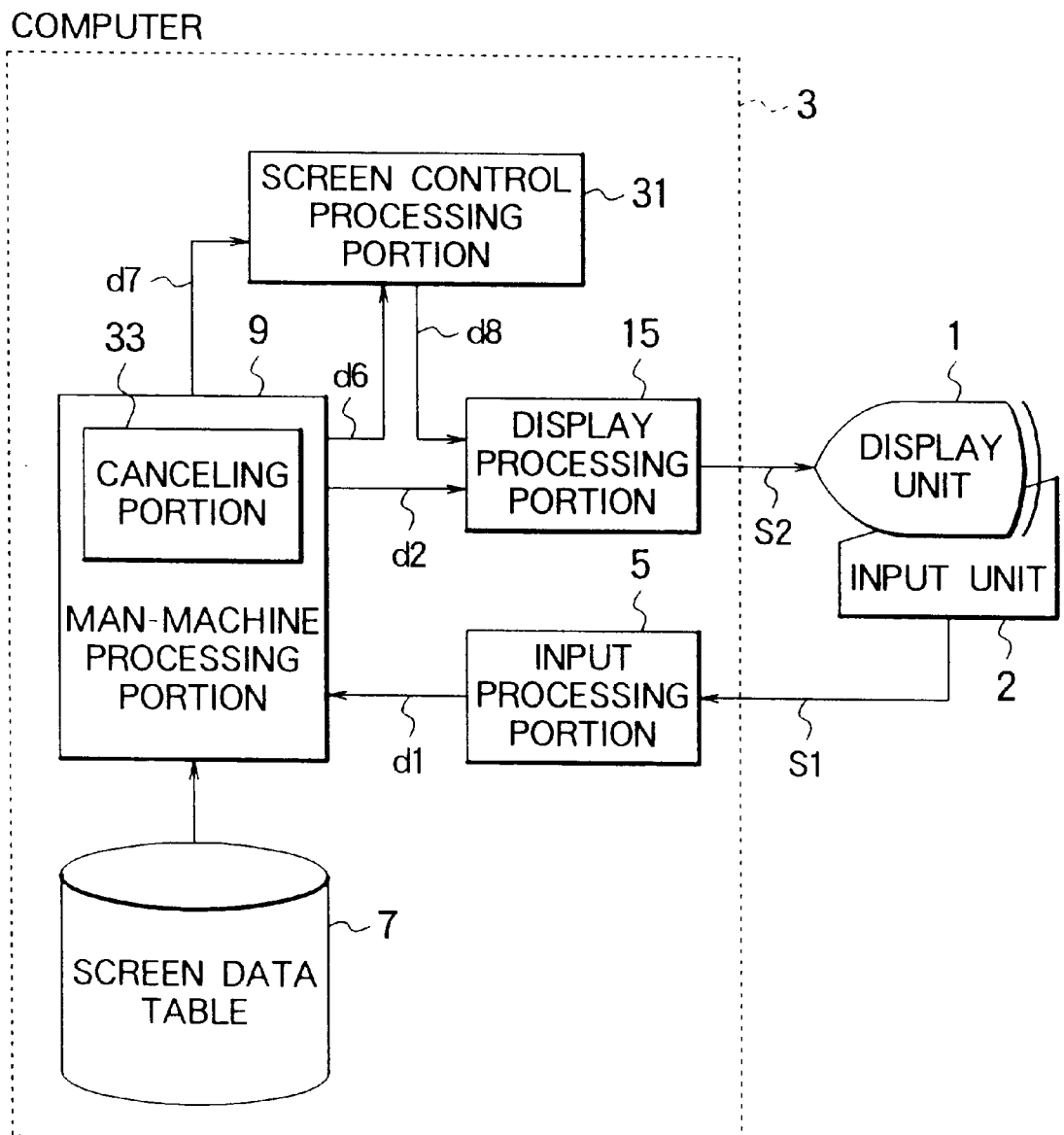
FIG. 14 is a block diagram showing a page turning apparatus according to a fourth embodiment of the present invention.

Now, with reference to FIGS. 14 to 16, the operation of the embodiment in the case that the user operates the cancellation button P0 on the screen G2 corresponding to screen page number 2 shown in FIG. 16 so as to restore the screen page of G2 to the preceding page.

When the page turning button P1 on the screen G2 corresponding to screen page number 2 shown in FIG. 16 is operated by clicking the left button of the mouse, the man-machine processing portion 9 outputs screen data d2 corresponding to screen page number 5 set up as a destination page number in the screen data table 7 shown in FIG. 15 to the display processing portion 15. The display processing portion 15 replaces the screen page of the display unit 1 to the page corresponding to screen page number 5.

In addition, the man-machine processing portion 9 stores the screen page number 5 as the number of the current screen page, obtains the screen data d6 corresponding to the screen page number 2 that has been stored from the screen data table 7 shown in FIG. 16, and outputs the screen data d6 to the screen control processing portion 31. The screen control processing portion 31 stores the screen data d6 as screen data that had been displayed before turning page.

On the other hand, when the cancellation button P0 on the screen C2 corresponding to the screen page number 2 shown in FIG. 16 is selected by clicking the left button of the mouse, as shown in FIG. 15, the destination page number corresponding to the button is 0. When the man-machine processing portion 9 obtains the destination page number 0 from the screen data table 7, the canceling portion 33 outputs the cancellation request d7 to the screen control processing portion 31.

When the screen control processing portion 31 receives the cancellation request d7, the screen control processing portion 31 outputs screen data stored in the above-described manner as screen data d8 to the display processing portion 15. The display processing portion 15 restores the screen page of the display unit 1 to the page preceding the screen page of G2.

Thus, in this embodiment, by operating the cancellation button P0 displayed on the screen as shown in FIG. 16, the page preceding the current screen page can be restored.

Figure 17:
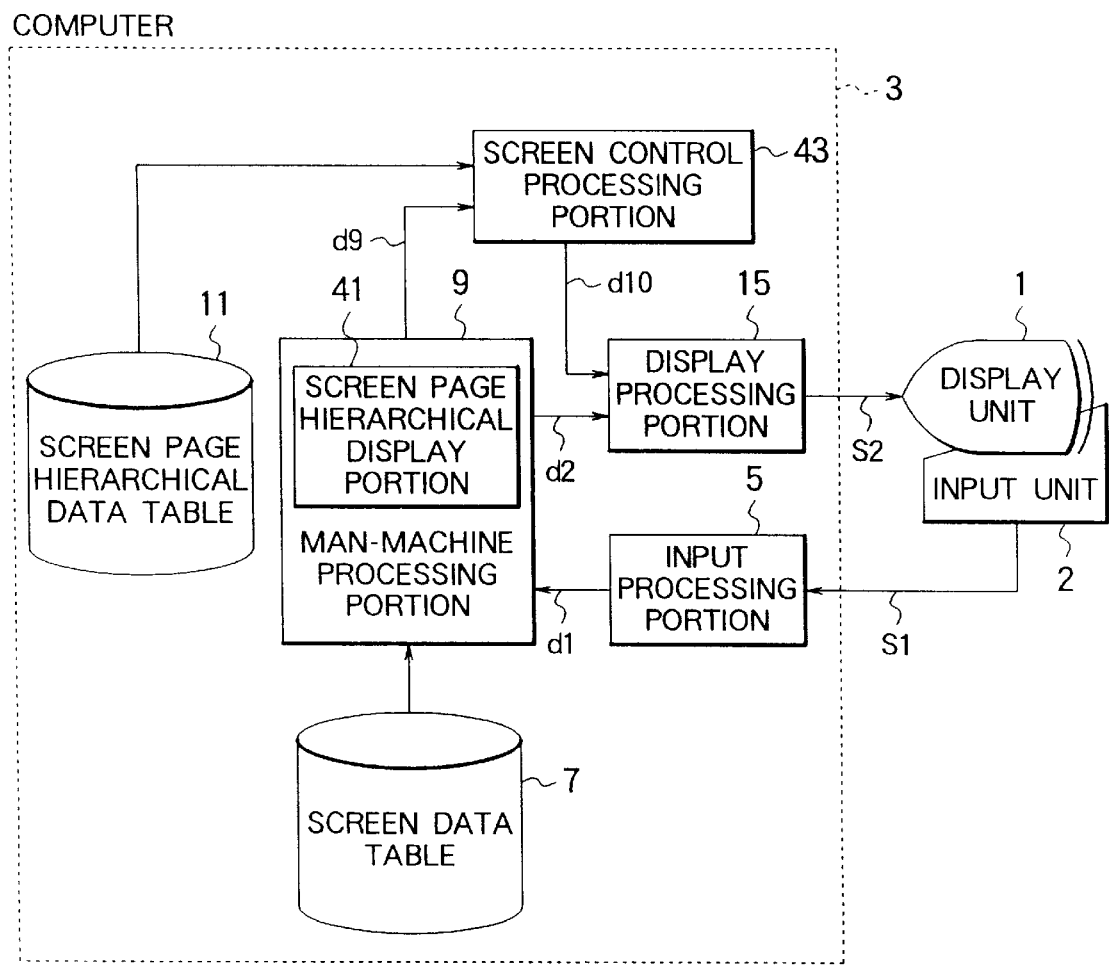
FIG. 17 is a block diagram showing a page turning apparatus according to a fifth embodiment of the present invention.

Now, with reference to FIG. 17, a page turning apparatus according to a fifth embodiment of the present invention will be described. In the page turning apparatus according to the fifth embodiment of the present invention, a man-machine processing portion 9 generates screen data d2, or makes a screen page hierarchical display portion 41 generate a screen page hierarchical display request d9 depending to an operation type of a page turning button selected on the screen. A screen control processing portion 43 generates screen page hierarchical data d10 that represents the relation between the current screen page and a destination page based on a screen page hierarchical data table 11 corresponding to the screen page hierarchical display request d9 and causes a display processing portion 15 to display the screen page hierarchical data d10 as a window on the screen of a display unit 1.

FIG. 18 shows an example of page turning button display information, page turning operation information, and destination page information for individual screen pages stored in a screen data table 7. The page turning buttons have destination page names so that the user can easily know what pages will be displayed corresponding to the page turning buttons.

Figure 19:
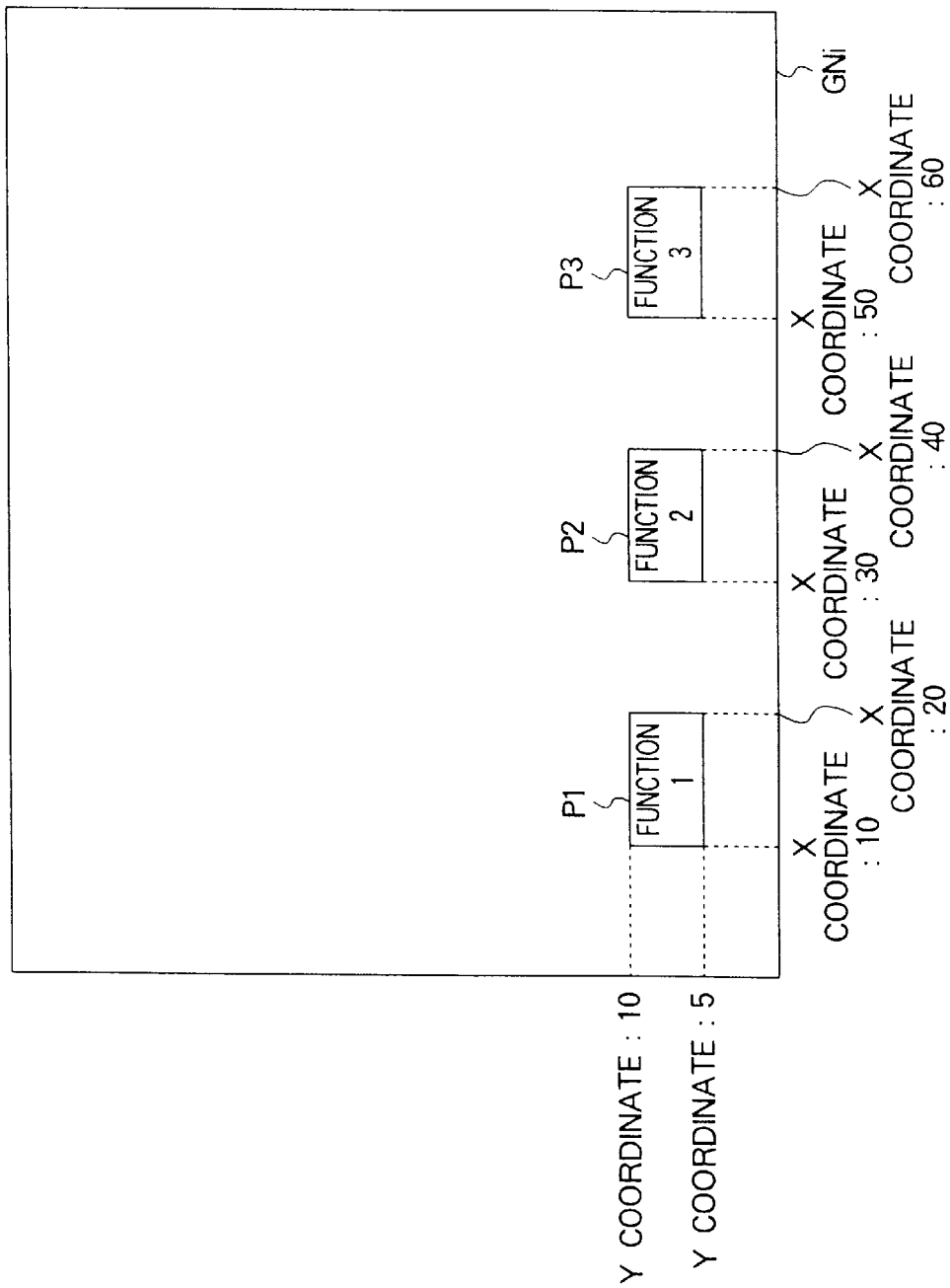
FIG. 19 is a schematic diagram showing a screen image corresponding to screen page number Ni in the screen data table shown in FIG. 18.

FIG. 19 shows a screen image GNi corresponding to screen page number Ni shown in FIG. 18. In FIG. 19, P1, P2, and P3 are page turning buttons corresponding to button type numbers 1, 2, and 3, respectively.

Figure 20:
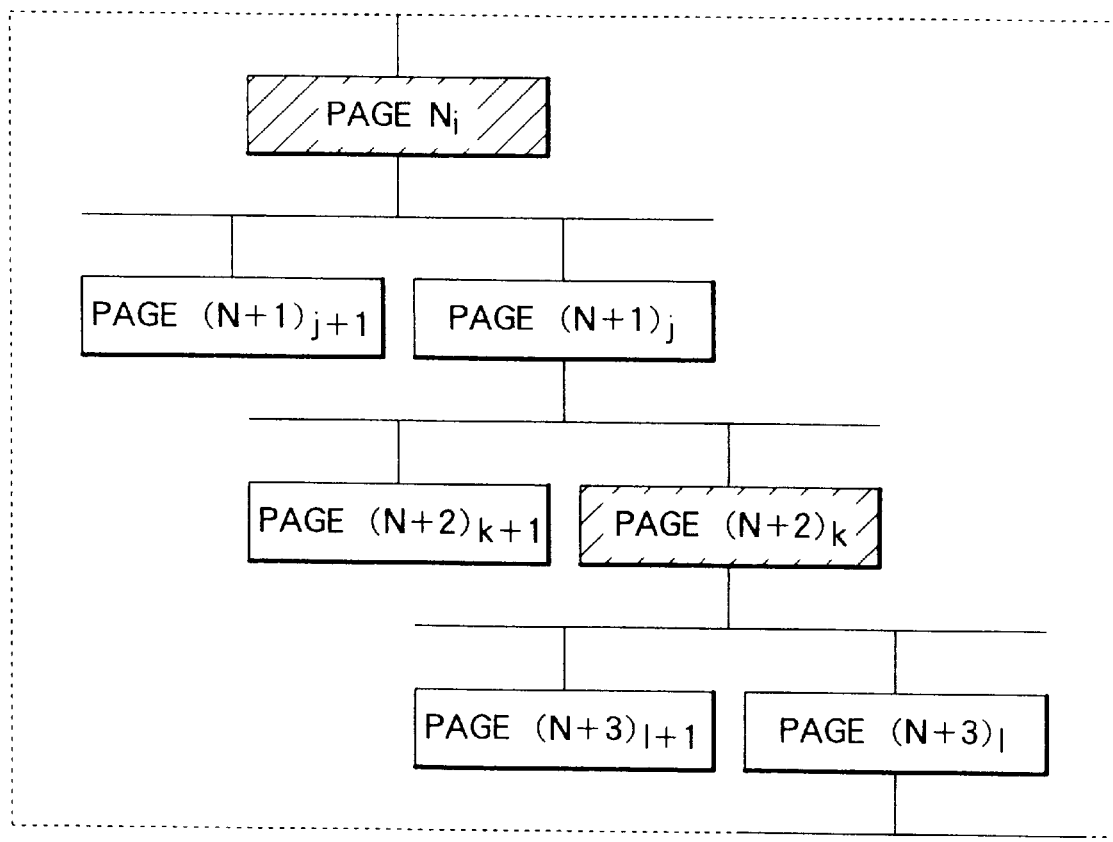
FIG. 20 is a schematic diagram showing an example of a screen page hierarchical chart displayed as a window on the screen of the display unit.

FIG. 20 shows an example of a screen page hierarchical chart displayed as an window on the screen of the display unit 1 by the screen control processing portion 43.

Now, with reference to FIGS. 17 to 20, the operation for displaying the screen page hierarchical chart that represents the relation between the current screen page (corresponding to screen page number $N_i$) and a destination screen page that is a "function 1" page (corresponding to screen number $(N+2)_k$) will be described. The screen page hierarchical chart is displayed when the user operates a "function 1" button P1 on a screen GNi corresponding to screen page number $N_i$ shown in FIG. 19.

When the user clicks the right button of the mouse at the position of the "function 1" button P1 on the screen GNi shown in FIG. 19, since clicking left button of the mouse is set as the page turning operation in the screen data table 7 as shown in FIG. 18, the man-machine processing portion 9 determines that a page turning request to the "function 1" page has not been issued. Thus, the screen hierarchical display portion 41 in the man-machine processing portion 9 outputs the current screen page number $N_i$, and the destination page number $(N+2)_k$ as the screen page hierarchical display request d9 to the screen control processing portion 43.

The screen control processing portion 43 references the screen page hierarchical data table 11 shown in FIG. 5 corresponding to the current screen page number and the destination page number that have been input as the screen page hierarchical display request d9, generates a screen page hierarchical chart, sets up colors for the screen page hierarchical chart so that the current screen page, the destination page, and the pass from the current screen page to the destination page can be clearly distinguished, and outputs the screen page hierarchical data d10 to the display processing portion 15.

The display processing portion 15 displays the screen page hierarchical chart as shown in FIG. 20 as a window on the screen GNi of the display unit 1 corresponding to the screen page hierarchical data d10 received from the screen control processing portion 43.

In this embodiment, when a page turning button is selected in a particular way different from the predetermined page turning operation, the screen page hierarchical chart shown in FIG. 20 can be displayed. Thus, the relation of hierarchical positions of the current screen page and the destination page can be immediately known.

Figure 21:
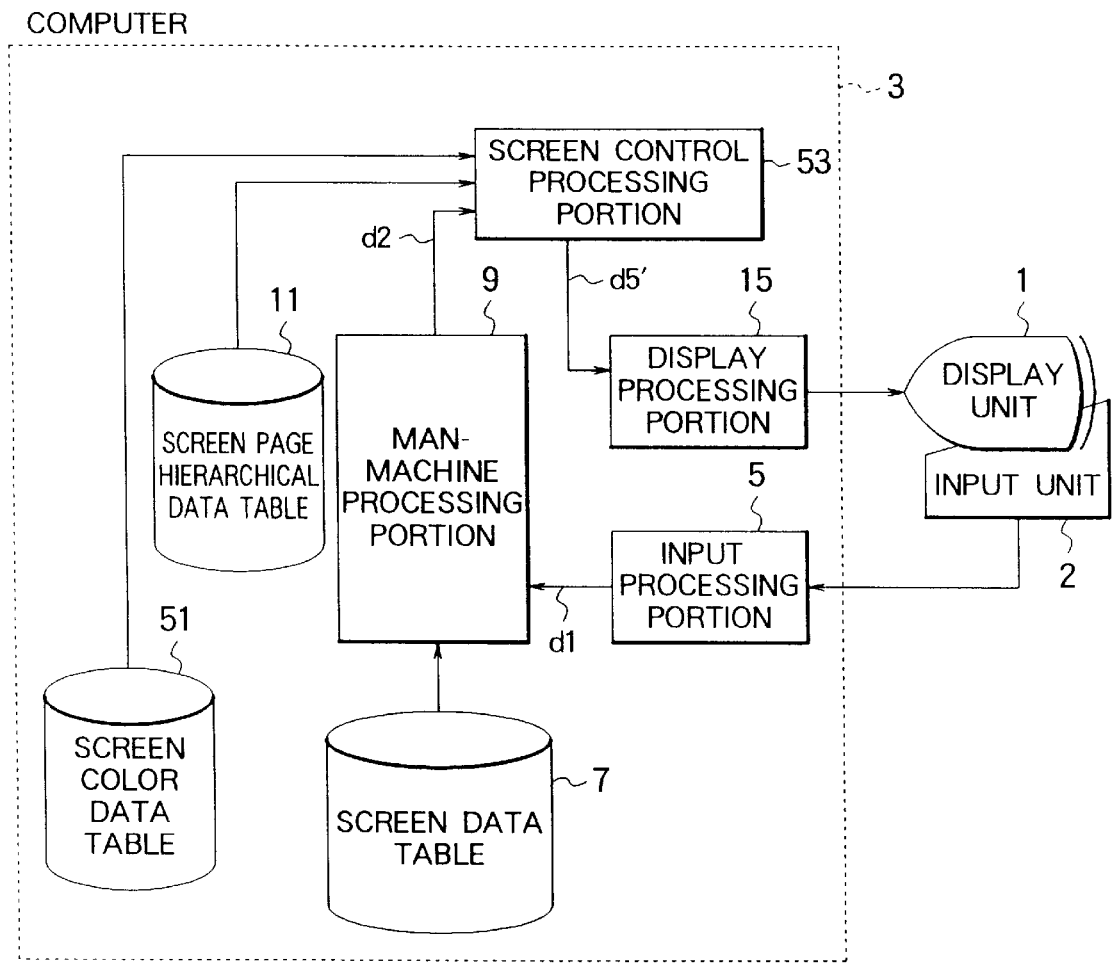
FIG. 21 is a block diagram showing a page turning apparatus according to a sixth embodiment of the present invention.

Now, with reference to FIG. 21, a page turning apparatus according to a sixth embodiment of the present invention will be described. In this embodiment, since colors of page turning buttons displayed on the screen of a display unit 1 are changed corresponding to hierarchical and functional positions of the destination pages in the screen page hierarchical chart, a screen color data table 51 and a screen control processing portion 53 are added. The screen color data table 51 stores colors of page turning buttons. The screen control processing portion 53 determines the colors of page turning buttons in screen data d2 received from a man-machine processing portion 9 based on the screen color data table 51 and outputs button color setup screen data d5' to a display processing portion 15.

FIG. 22 shows an example of page turning button information stored in a screen data table 7. In this embodiment, individual button type numbers have destination page names (for example, "function 1", "function 2", and "function 3") so that the user can easily know the relation between page turning buttons and destination pages.

Figure 23:
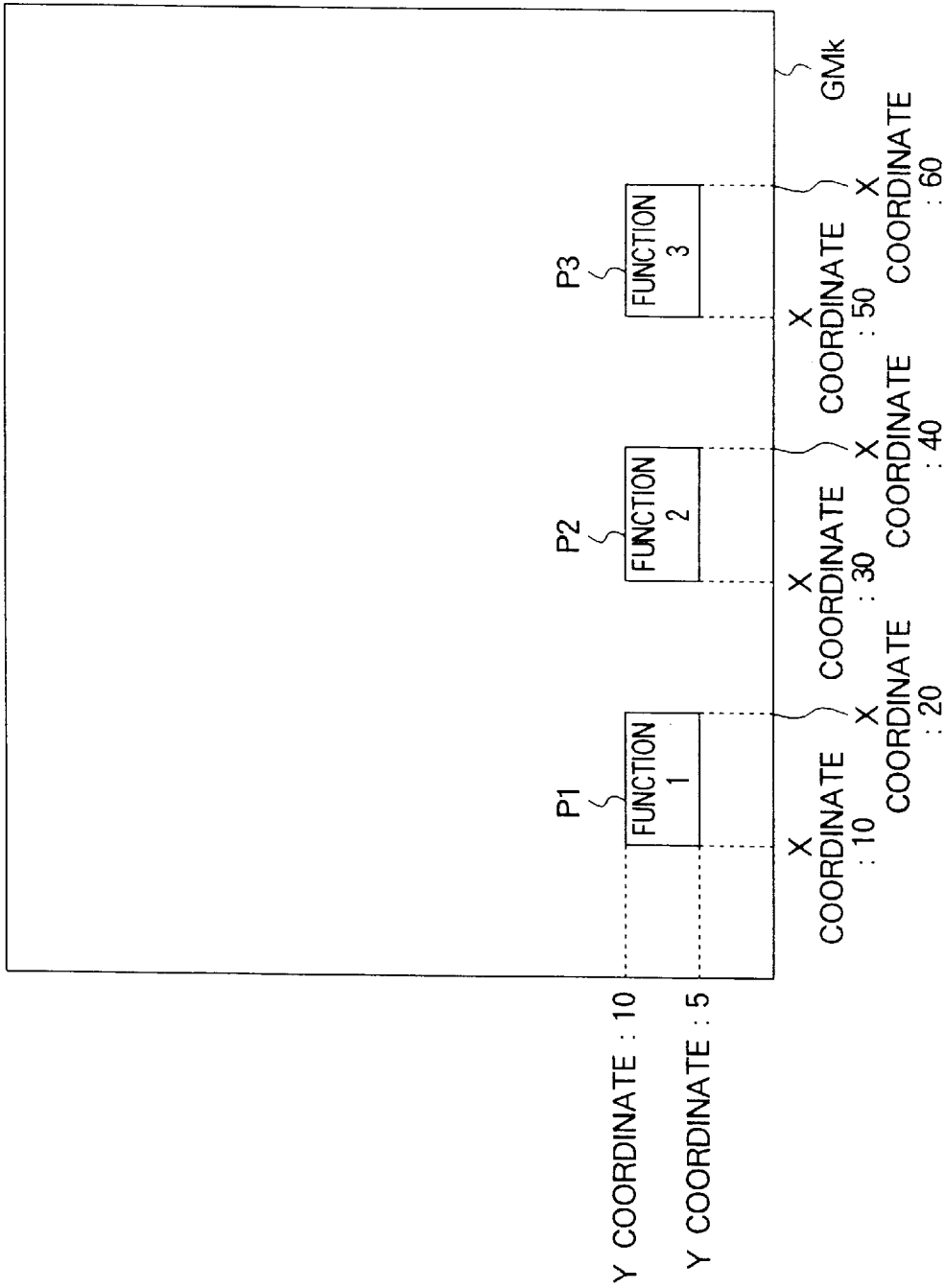
FIG. 23 is a schematic diagram showing a screen image corresponding to screen page number Mk in the screen data table shown in FIG. 22.

FIG. 23 shows a screen image GMk corresponding to screen page number Mk in the screen data table 7 shown in FIG. 22. In FIG. 23, P1, P2, and P3 are page turning buttons corresponding to button type numbers 1, 2, and 3, respectively.

FIG. 24 shows an example of data stored in a screen page hierarchical data table 11. The screen page hierarchical data table 11 has a screen page number field, a hierarchy number field, and a function number field.

As shown in FIG. 25, the screen color data table 51 has a screen color data by function field 51a and a screen color data field 51b. The screen color data field by function field 51a stores screen color numbers corresponding to individual function numbers. The screen color data field 51b stores color numbers representing densities of screen colors corresponding to hierarchy numbers.

Figure 26:
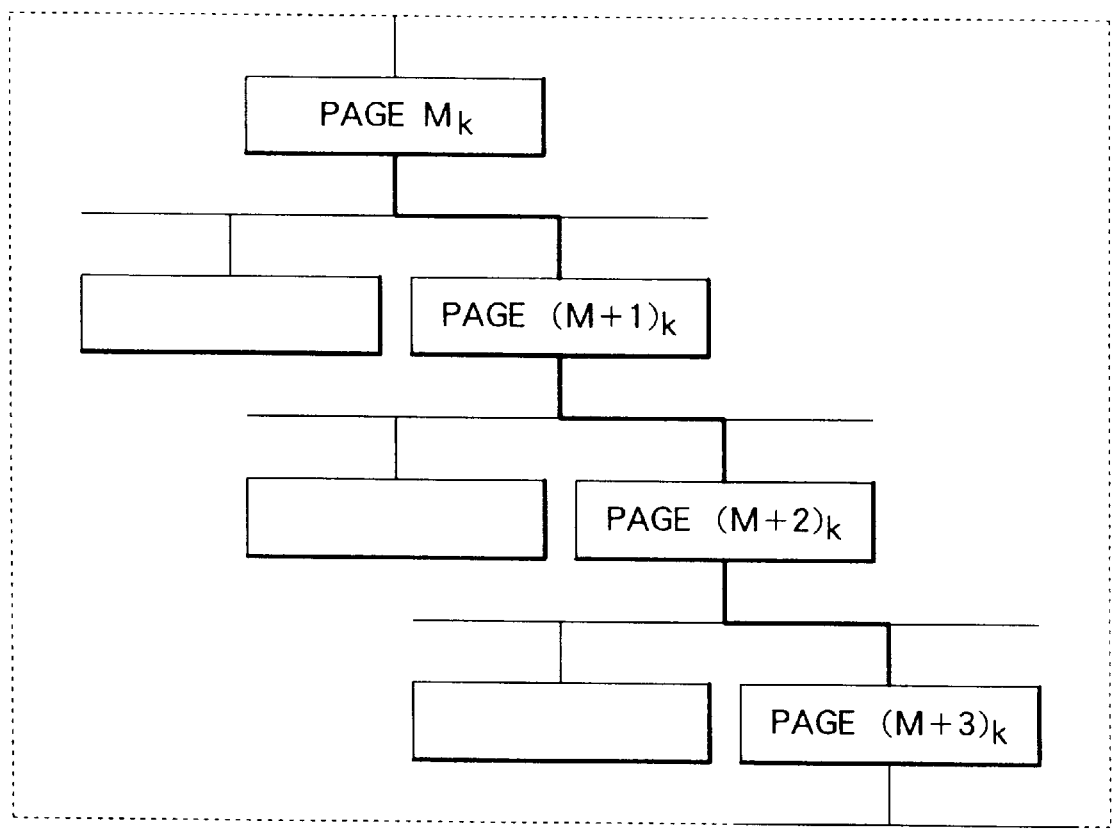
FIG. 26 is a schematic diagram showing an example of a function group of screen pages in a screen page hierarchical chart.

FIG. 26 shows an example of a page group corresponding to a function number k of hierarchy (hierarchy numbers M, M+1, M+2, and M+3) in the screen page hierarchical chart. Although the hierarchical positions of the screen $M_k$, screen $(M+1)_k$, screen $(M+2)_k$, and screen $(M+3)_k$ are different from each other, they are included in the same function group.

Now, with reference to FIGS. 21 to 26, the operation according to this embodiment will be described. In this operation, for example, the screen page shown in FIG. 23 is displayed.

When the man-machine processing portion 9 receives input data d1 corresponding to a selected page turning button from the input processing portion 5, the man-machine processing portion 9 obtains screen data d2 from the screen data table 7 shown in FIG. 22 and outputs the screen data d2 to the screen control processing portion 53. The screen data d2 is composed of a destination page number $M_k$, button information displayed on the destination page, and a button display region. The screen data d2 has default values of button colors regardless of button types.

The screen control processing portion 53 references the screen page hierarchical data table 11 shown in FIG. 24 and the screen color data table 51, determines colors of page turning buttons displayed on the screen based on the destination page numbers set for the buttons, and outputs button color setup screen data d5' to the display processing portion 15. In other words, since page turning buttons corresponding to button type number 1 having destination page number $(M+2)_k$, corresponding to button type number 2 having destination page number $(M+1)_k$, and corresponding to button type number 3 having destination page number $(M+1)_{k+1}$ are displayed on a screen displaying the page of number $M_k$, screen color numbers W, W, and X are set up to the page turning buttons based on the screen page hierarchical data table 11 shown in FIG. 24 and the screen color data table 51 shown in FIG. 25. Color numbers 64, 19, and 20 that represent color types and densities are defined according to the screen color numbers W, W, and X and hierarchy numbers of individual destination pages. Thus, colors of page turning buttons to be displayed are set up.

The display processing portion 15 displays a screen image GMk as shown in FIG. 23 on the display unit 1 corresponding to the button color setup screen data d5' received from the screen control processing portion 53.

A page turning button P1 corresponding to button type number 1, a page turning button P2 corresponding to button type number 2, a page turning button P3 corresponding to button type number 3 having destination page names "function 1", "function 2", and "function 3" are displayed on the screen GMk. The color type of the "function 1" button P1 is the same as the color type of the "function 2" button P2. However, the color density of the "function 1" button P1 is different from the color density of the "function 2" button P2. The color type of the "function 3" button P3 is deferent from the color types of the "function 1" button P1 and the "function 2" button P2. Thus, the user can know that the "function 1" and the "function 2" are functions in the same group.

Thus, in this embodiment, the user can recognize the hierarchical and functional relation between the page turning buttons displayed at a glance and quickly know the method of turning the current page to a desired page.

In addition, when shapes of buttons to be displayed on the screen are defined with function numbers or hierarchy numbers in the screen color data table 51, page turning buttons can be displayed in different shapes corresponding to functions and hierarchical positions. For example, the "function 1" button P1 and the "function 2" button P2 may be displayed as a square and the "function 3" button P3 may be displayed as an ellipse on the screen displaying the page of number Mk shown in FIG. 23, respectively.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A page turning apparatus for use in a computer system, the apparatus comprising:

a display unit;

an input unit;

means for placing a page turning symbol and a guide display symbol on a current screen page displayed on a screen of said display unit;

means for turning the current screen page to a destination screen page related to the page turning symbol which is selected on the current screen page by said input unit; and means for displaying a screen page hierarchical chart on the screen of said display unit when the guide display symbol is selected by said input unit, the screen page hierarchical chart representing a hierarchical relation between the current screen page and other screen pages by blocks corresponding to the screen pages and lines connecting the blocks.

2. The page turning apparatus as set forth in claim 1, wherein said displaying means comprises:

means for coloring the screen page hierarchical chart so as to distinguish a block corresponding to the current screen page.

3. The page turning apparatus as set forth in claim 1, wherein said displaying means comprises:

means for storing information representing hierarchical positions and function types of individual screen pages; and means for generating the screen page hierarchical chart based on the information representing the hierarchical positions and function types.

4. The page turning apparatus as set forth in claim 1, further comprising:

means for turning the current screen page to a destination screen page when the corresponding block in the screen page hierarchical chart is selected by said input unit.

5. The page turning apparatus as set forth in claim 1, further comprising:

means for coloring the page turning symbol on the current screen page corresponding to a hierarchical position of a destination screen page displayed by selecting the page turning symbol.

6. The page turning apparatus as set forth in claim 5, wherein said coloring means comprises:

means for storing screen color information of the page turning symbols at individual hierarchical positions of destination screen pages displayed by the page turning symbols; and means for setting up a color of the page turning symbol to be displayed on said display unit based on the screen color information.

7. The page turning apparatus as set forth in claim 1, further comprising:

means for coloring the page turning symbol corresponding to a function type and a hierarchical position of a destination screen page displayed by selecting the page turning symbol.

8. The page turning apparatus as set forth in claim 7, wherein said coloring means comprises:

means for storing screen information representing hierarchical positions and function types of individual screen pages;

means for storing screen color information of the page turning symbol corresponding to the function type and the hierarchical position of a destination screen page displayed by the page turning symbol, the screen color information varying a color density of the page turning symbol corresponding to the function type of the destination screen page displayed by the page turning symbol; and means for setting up a color of the page turning symbol displayed on said display unit corresponding to the screen information and the screen color information.

9. The page turning apparatus as set forth in claim 1, further comprising:

means for placing a cancellation symbol on the current screen page displayed on the screen of said display unit; and means for restoring the current screen page to a screen page preceding the current page when the cancellation symbol is selected by the input unit.

10. The page turning apparatus as set forth in claim 9, wherein said restoring means comprises:

means for storing information of a current screen page displayed on said display unit when said turning means outputs a destination screen page to said display unit; and means for outputting the information stored in said storing means to said display unit when the cancellation symbol is selected by said input unit.

11. A page turning apparatus for use in a computer system, the apparatus comprising:

a display unit;

an input unit;

means for placing a page turning symbol on a current screen page displayed on a screen of said display unit;

means for turning the current screen page to a destination screen page related to the page turning symbol which is selected on the current screen page by a predetermined operation; and means for displaying a screen page hierarchical chart on the screen of said display unit when the page turning symbol is selected with another operation different from the predetermined operation by said input unit, the screen page hierarchical chart representing a hierarchical relation between the current screen page and the destination page displayed by the predetermined operation of the page turning symbol;

wherein said displaying means comprises means for coloring the screen page hierarchical chart so as to distinguish a block corresponding to the current screen page, a block corresponding to the destination screen page, and a line connecting the blocks.

12. A page turning apparatus for use in a computer system, the apparatus comprising:

a display unit;

an input unit;

means for placing a page turning symbol on a current screen page displayed on a screen of said display unit;

means for turning the current screen page to a destination screen page related to the page turning symbol which is selected on the current screen page by a predetermined operation; and means for displaying a screen page hierarchical chart on the screen of said display unit when the page turning symbol is selected with another operation different from the predetermined operation by said input unit, the screen page hierarchical chart representing a hierarchical relation between the current screen page and the destination page displayed by the predetermined operation of the page turning symbol;

wherein said displaying means comprises means for storing information representing hierarchical positions and function types of individual screen pages; and means for generating the screen page hierarchical chart based on the information representing the hierarchical positions and function types.

\* \* \* \* \*

UNITED STATES PATENT AND TRADEMARK OFFICE
CERTIFICATE OF CORRECTION

PATENT NO.    : 5,937,419  
DATED         : August 10, 1999  
INVENTOR(S)   : Oshiro et al.

Page 1 of 1

It is certified that error appears in the above-identified patent and that said Letters Patent is hereby corrected as shown below:

<u>Column 14, claim 12,</u>  
Line 15, after "screen pages" insert -- distinguishing a block corresponding to the destination screen page, and a line connecting the blocks --.

Signed and Sealed this

Twelfth Day of February, 2002

Attest:

JAMES E. ROGAN  
*Attesting Officer*   *Director of the United States Patent and Trademark Office*